(12) United States Patent
Cella Mazzariol et al.

(10) Patent No.: US 9,322,409 B2
(45) Date of Patent: Apr. 26, 2016

(54) VENTILATION UNIT FOR FLOW REVERSAL

(71) Applicant: Entsorgafin S.P.A., Tortona (al) (IT)

(72) Inventors: Pietro Paolo Cella Mazzariol, Tortona (IT); Gian Francesco Galanzino, Tortona (IT); Alessandro Avonto, Tortona (IT)

(73) Assignee: Entsorgafin S.p.A., Tortona (AL) (IT)

( * ) Notice: Subject to any disclaimer, the term of this patent is extended or adjusted under 35 U.S.C. 154(b) by 0 days.

(21) Appl. No.: 14/400,700

(22) PCT Filed: May 14, 2013

(86) PCT No.: PCT/IB2013/053933
§ 371 (c)(1),
(2) Date: Nov. 12, 2014

(87) PCT Pub. No.: WO2013/171675
PCT Pub. Date: Nov. 21, 2013

(65) Prior Publication Data
US 2015/0132838 A1 May 14, 2015

(30) Foreign Application Priority Data
May 14, 2012 (IT) .............................. TO2012A0431

(51) Int. Cl.
*F16K 11/065* (2006.01)
*F04D 25/10* (2006.01)
(Continued)

(52) U.S. Cl.
CPC ............ *F04D 25/10* (2013.01); *C05F 17/0258* (2013.01); *F04D 27/00* (2013.01); *F04D 27/005* (2013.01); *F24F 7/00* (2013.01); *F24F 11/0001* (2013.01); *F24F 2007/005* (2013.01); *Y02W 30/43* (2015.05)

(58) Field of Classification Search
CPC ... F04D 25/10; F04D 27/007; C05F 17/0258; C02F 3/02
USPC ........... 454/251, 237, 333, 105, 108, 109, 75; 137/625.44, 637
See application file for complete search history.

(56) References Cited

U.S. PATENT DOCUMENTS 1,848,811 A 3/1932 Welch
2,184,484 A * 12/1939 Bojner ..................... F24F 7/08
454/234

(Continued)

FOREIGN PATENT DOCUMENTS

EP 1431262 A1 6/2004
EP 2017481 A2 1/2009

*Primary Examiner* — Steven B McAllister
*Assistant Examiner* — Frances F Hamilton
(74) *Attorney, Agent, or Firm* — Howson & Howson LLP

(57) ABSTRACT

A ventilation unit is arranged to effect flow reversal, according to two opposite directions, of a gas flow generated by a fan without reversing the rotation direction of the fan. The ventilation unit includes a fan, at least a first piping arrangement through which a gas flow is intended to pass in one of the two possible directions depending on whether it is blown or sucked by the fan, and a switching assembly arranged between the fan and the at least a first piping arrangement, at least a pair of switching devices being provided in the switching assembly and being movable between two positions for selectively and alternately connecting the at least a first piping arrangement to a delivery duct and to a suction duct of the fan, so as to allow the passage of a gas flow in a direction or in the opposite direction within the at least a first piping arrangement.

7 Claims, 4 Drawing Sheets

(51) Int. Cl.
*C05F 17/02* (2006.01)
*F24F 7/00* (2006.01)
*F24F 11/00* (2006.01)
*F04D 27/00* (2006.01)

(56) References Cited

U.S. PATENT DOCUMENTS

| | | | | |
|---|---|---|---|---|
| 2,347,936 A | * | 5/1944 | Crewson | F26B 21/04 137/552 |
| 4,228,786 A | * | 10/1980 | Frankenfield | F24D 5/00 126/400 |
| 4,310,020 A | | 1/1982 | Jespersen et al. | |
| 4,353,412 A | * | 10/1982 | Krumhansl | F24D 11/0264 165/240 |
| 5,031,514 A | * | 7/1991 | Kice | F24F 13/04 454/250 |
| 5,065,585 A | * | 11/1991 | Wylie | F24F 3/044 62/180 |
| 5,687,764 A | * | 11/1997 | Tanaka | F16K 11/0525 137/625.43 |
| 6,116,264 A | * | 9/2000 | Bachmann | F16K 11/052 137/240 |
| 6,207,447 B1 | * | 3/2001 | Gould | C05F 17/027 435/290.1 |
| 9,022,842 B2 | * | 5/2015 | Tanishima | B66B 11/0226 454/68 |
| 2009/0029642 A1 | * | 1/2009 | Martel | F24F 12/006 454/358 |
| 2009/0293973 A1 | * | 12/2009 | Albert | F02B 29/0418 137/625.44 |
| 2011/0247694 A1 | * | 10/2011 | Sheldon | F24F 13/0236 137/1 |
| 2011/0281516 A1 | * | 11/2011 | Newcomer | F24F 3/044 454/231 |
| 2012/0064818 A1 | * | 3/2012 | Kurelowech | F24F 12/006 454/251 |

* cited by examiner

VENTILATION UNIT FOR FLOW REVERSAL

TECHNICAL FIELD OF THE INVENTION

The present invention refers to a ventilation unit arranged to effect flow reversal, according to two opposite directions, of a gas flow.

More precisely, the present invention refers to a ventilation unit arranged to effect flow reversal, according to two opposite directions, of a gas flow generated by a fan without reversing the rotation direction of the fan.

Particularly, the present invention refers to a ventilation unit arranged to effect flow reversal, according to two opposite directions, of a gas flow applicable to plants for the aerobic treatment of organic waste.

PRIOR ART

An example of a plant for the aerobic treatment of organic waste is described in European Patent EP 1 431 262 in the name of the present Applicant.

A plant of the aforementioned type, housed within a closed building, includes an aerated floor, or pavement, on which the organic waste to be treated is deposited in heaps, the aerobic treatment of such organic waste being effected in a fermentation/bio-oxidation phase obtained by means of forced air; said plant further includes means for generating an air alternate air flow in two opposite directions, through said floor and said heaps, said means preferably consisting of fans, pairs of three-way valves and by-passes for continuously inverting the air flow generated by said fans.

A drawback of the last described solution lies in its structural and operational complexity and, consequently, in its requiring a non-negligible expenditure of resources; indeed, it is necessary to set up a quite articulated circuit, in which each valve requires its own actuator, this making the system extremely expensive.

European Patent EP 2 017 481, in the name of the present Applicant, describes a ventilation unit which allows, by means of a single fan and a set of valves controlled by a single actuator, to obtain an alternate flow according to two opposite directions and moreover, optionally, to suck fresh air from the outside. In said ventilation unit the fan operates continuously and without reversal of its sense of rotation, whereas the flow reversal is effected by acting only on the valves by means of a single actuator.

Even if the ventilation unit described in EP 2 017 481 constitutes a satisfactory solution for effecting flow reversal of a gas flow generated by a fan without reversing the rotation direction of the fan, it is not free from drawbacks.

In particular, the Applicant has found that using said ventilation unit entails non-negligible head losses due to turbulences existing in the generated gas flow.

Similarly, the document U.S. Pat. No. 6,207,447 describes a ventilation unit which allows, by means of a single fan and a set of valves controlled by a single actuator, to obtain an alternate flow according to two opposite directions and moreover, optionally, to suck fresh air from the outside.

However, also the ventilation unit described in the aforesaid document has a complex structure with a high number of moving parts, which involves a remarkable risk of failures and malfunctioning, thus making the reliability of the ventilation unit unsatisfactory.

The document U.S. Pat. No. 4,310,020 too describes a ventilation unit that is very complex and has a high number of moving part and it is therefore scarcely reliable.

The document U.S. Pat. No. 1,848,811 describes a ventilation unit which allows, by means of a single fan, to obtain an alternate flow according to two opposite directions.

However, the ventilation unit described therein allows only to reverse the flow along a closed-loop flow circuit, but it does not allow, for instance, to suck fresh air from the outside, this remarkably limiting the field of its possible applications and making it unsuitable, inter alia, for applications in plants for the aerobic treatment of organic waste.

It is the main object of the present invention to overcome the aforesaid drawback by providing a ventilation unit for flow reversal wherein head losses are reduced to a minimum.

It is another object of the present invention to provide a ventilation unit that is compact and has a limited number of moving mechanical parts, with a corresponding reduction of installation and operation costs.

DISCLOSURE OF THE INVENTION

According to the invention, the ventilation unit includes a fan, at least a first piping arrangement through which a gas flow is intended to pass in one of the two possible directions depending on whether it is blown or sucked by said fan, and a switching assembly arranged between said fan and said first piping arrangement, at least a switching device being provided in said switching assembly and being movable between two positions for selectively and alternately connecting said at least the first piping arrangement to the delivery duct and to the suction duct of said fan, so as to allow the passage of a gas flow in a direction or in the opposite direction within said first piping arrangement.

Besides being connected to the first piping arrangement, the suction and delivery ducts of the fan of the ventilation unit can be connected to the outer environment through the switching assembly for sucking an air flow from the outside or discharging an air flow into a second piping arrangement.

Particularly, in applications where the gas flow to be discharged is somehow contaminated, said gas flow is not directly brought into the outer environment, but it is insufflated in a second piping arrangement that lead to filtration and/or purification means.

Preferably, said switching devices are two in number, each allowing/preventing the flow connection between said first piping arrangement and said delivery duct and suction duct of the fan, respectively.

Preferably said switching devices are made each by a wing pivotable between the aforesaid two positions.

Thanks to the presence of a simple wing provided along the piping arrangement, the turbulence of the gas flow is reduced and, consequently, also head losses are lower.

In particular, by realizing the switching devices as simple wings, the size of the clearance of the connections between the delivery and suction ducts and said first piping arrangement at these wings can be maximized, which facilitates a linear and turbulence-free behavior of the gas flow.

Owing to the fact that the only moving mechanical parts in the ventilation unit according to the invention are the aforementioned switching devices and that said switching devices are housed in a single switching assembly and are driven by a single common actuator, said ventilation unit is reliable and resistant and has very limited manufacturing and operating costs.

BRIEF DESCRIPTION OF THE DRAWINGS

A preferred embodiment of the ventilation unit for flow reversal according to the present invention, provided by way of non-limiting example, will be now described more in detail with reference to the attached drawings, in which.

DESCRIPTION OF A PREFERRED EMBODIMENT

Figure 1:
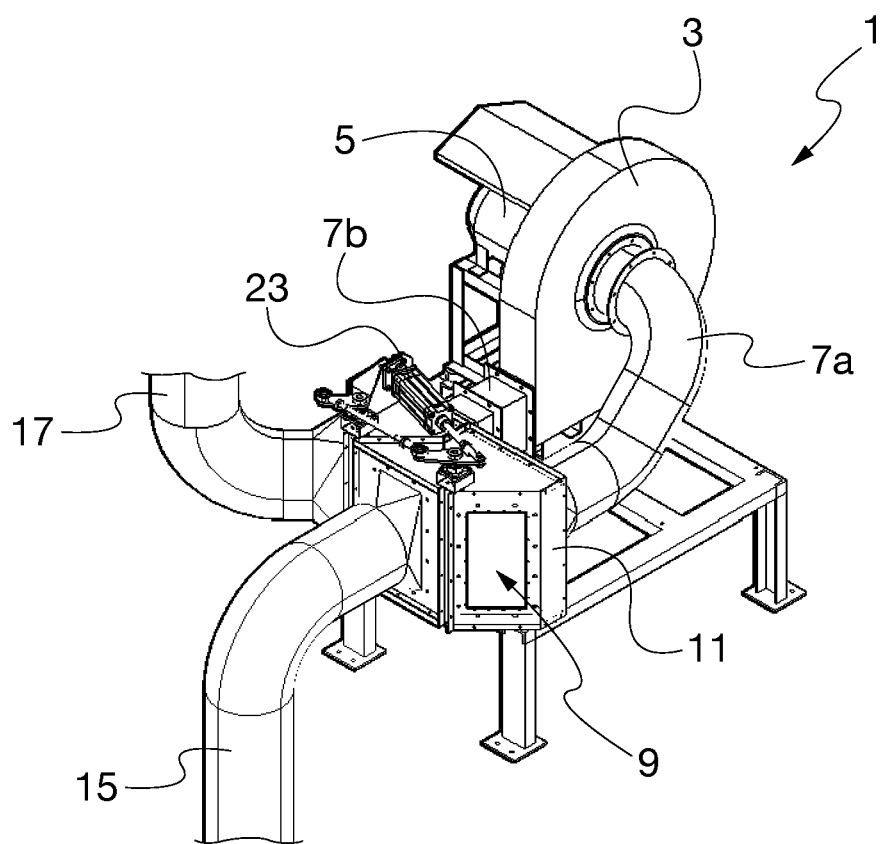
FIG. 1 shows a perspective view of a ventilation unit according to the invention.

With reference to FIG. 1, the ventilation unit 1 according to the invention comprises a suitably shaped housing 3, to be connected to a fan 5 having the function of moving the air flow to be processed, by conferring it the desired flow rate, prevalence and direction.

The housing 3 is connected through a first duct or suction duct 7a and through a second duct or delivery duct 7b to a switching assembly 9, and more particularly to the casing 11 of said switching assembly 9.

Figure 2A:
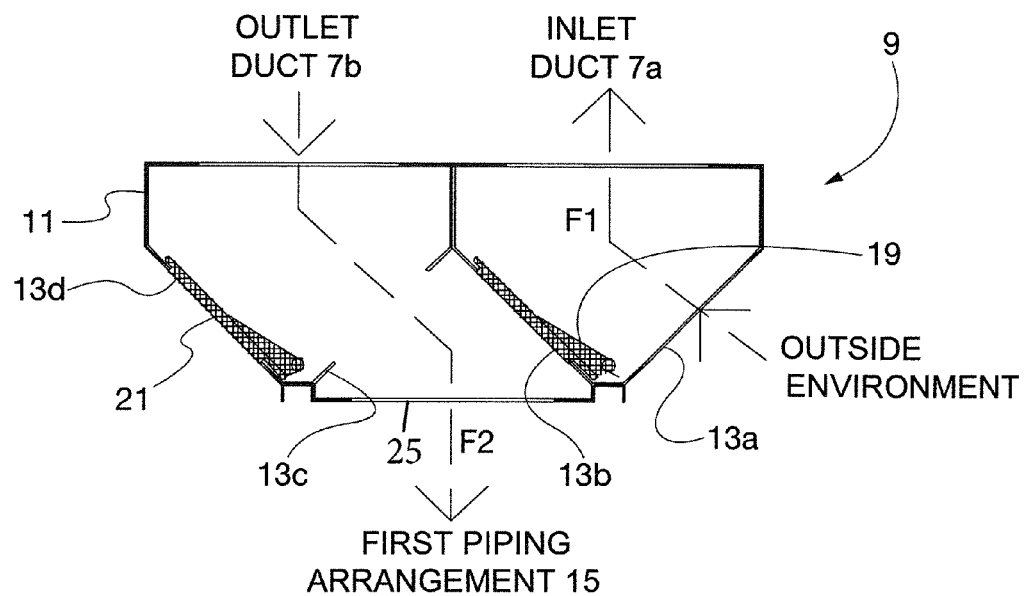
FIG. 2a shows, in a sectional view, the switching assembly of the ventilation unit of FIG. 1, in a first working position.
Figure 2B:
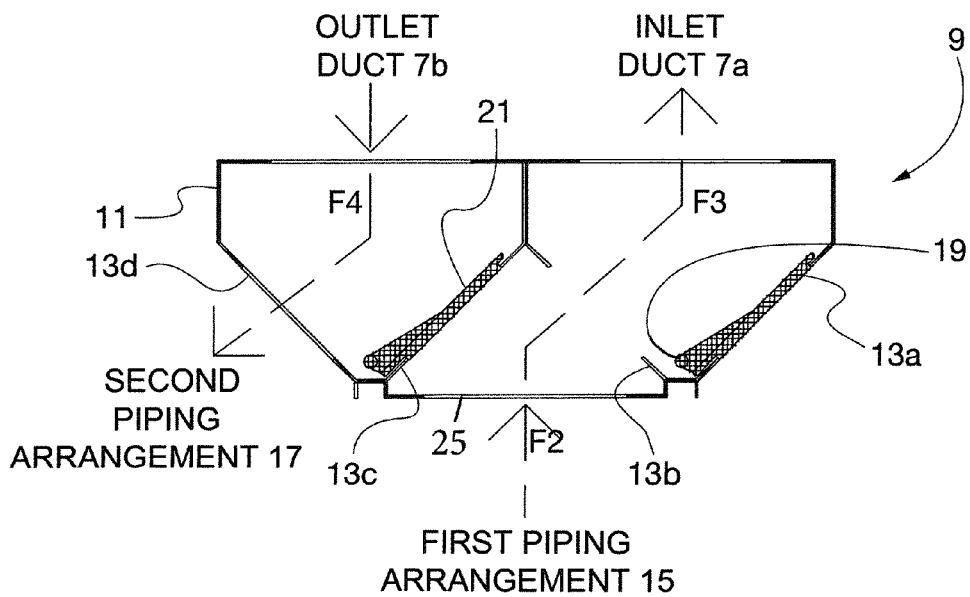
FIG. 2b shows, in a sectional view, the switching assembly of the ventilation unit of FIG. 1, in a second working position.

With reference also to FIGS. 2a and 2b, according to the invention in said casing 11 of the switching assembly 9, in addition to the passages at the suction duct 7a and delivery duct 7b, and in addition to a passage at a fifth opening (25) at a first piping arrangement there are provided four additional openings 13a,13b,13c,13d of which a first opening 13a connects the casing 11 to the outer environment, a second opening 13b and a third opening 13c connect the casing 11 to the fifth opening (25) at the first piping arrangement 15 and a fourth opening 13d connects the casing to the outer environment through a second piping arrangement 17.

Still according to the invention, to the first piping arrangement 15 there is associated a pair of switching devices 19, 21 movable between two end positions and adapted—by shifting from one of said positions to the other—to selectively connect said first piping arrangement at the fifth opening (25) to the delivery duct 7b or to the suction duct 7a of the fan 5, so as to allow/prevent the passage of the gas flow in a determined direction in said first piping arrangement, thus effecting the flow reversal.

In the preferred embodiment shown, the switching devices consist of simple wings 19, 21 pivotable around a hinging axis for shifting from one of said positions to the other one.

In particular, in FIG. 2a there is illustrated a first working configuration in which the wings 19, 21 are in a first position.

In said first working configuration, the second wing 21 obstructs the fourth opening 13d, thus preventing the passage of gas flow through the second piping arrangement 17, and leaves the third opening 13c free, thus allowing the connection between the delivery duct 7b of the fan and the first piping arrangement 15; at the same time, the first wing 19 obstructs the second opening 13b, thus preventing the connection between the suction duct 7a of the fan and the first piping arrangement 15, and leaves the first opening 13a free, in communication with the outer environment.

It will be evident to the person skilled in the art that in this configuration the fan 5, through its suction duct 7a, will suck a gas flow (especially an air flow) from the outer environment (arrow F1) and, through its delivery duct 7b, it will blow a gas flow into the first piping arrangement at the fifth opening (25) (arrow F2).

In FIG. 2b there is illustrated a second working configuration in which the wings 19, 21 have been brought from the aforesaid first position to a second position.

In said second working condition, the second wing 21 leaves the first opening 13d free, thus allowing the connection between the delivery duct 7b of the fan and the second piping arrangement 17, and obstructs the third opening 13c, thus preventing the connection between said delivery duct 7b and the first piping arrangement 15; at the same time the first wing 19 leaves the second opening 13b free, thus allowing the connection between the suction duct 7a of the fan and the first piping arrangement 15 at the fifth opening (25) and obstructs the first opening 13a, in communication with the outer environment.

It will be evident to the person skilled in the art that in this configuration the fan 5, through its suction duct 7a, will suck a gas flow from the first piping arrangement 15 (arrow F3) and, through its delivery duct 7b, it will blow a gas flow into the second piping arrangement (arrow F4) for subsequent discharge into the outer environment.

In this way the ventilation unit 1 effects the flow reversal in the first piping arrangement 15, while always maintaining the same rotation direction.

Due to the fact that the wing 19, 21 are the only moving parts of the switching assembly 9, said switching assembly 9 is compact, reliable, resistant and inexpensive.

Owing to the structure of the switching assembly according to the invention it is possible to make the openings 13a-13d with a clearance sufficiently wide to ensure that the gas flows passing through said openings have an essentially linear behavior: the absence of turbulences guarantees the possibilities of reducing head losses to a minimum, thus allowing to attain the object set forth above. Advantageously, as can be seen in FIG. 1, according to the preferred embodiment of the invention shown the wings 19, 21 can be driven simultaneously by a single actuator 23, thus additionally simplifying the structure and operation of the ventilation unit according to the invention.

Moreover, it is clear the it is also possible to provide, if desired, separate actuators for the two wings.

Similarly, the wings 19, 21 can be made as separate and different components or they can be integrated in the form of a single piece.

It is also evident that what has been described above with reference to the embodiment shown has been provided only by way of example and that several modifications and variants are possible without departing from the scope of the invention as defined by the appended claims.

Figure 3A:
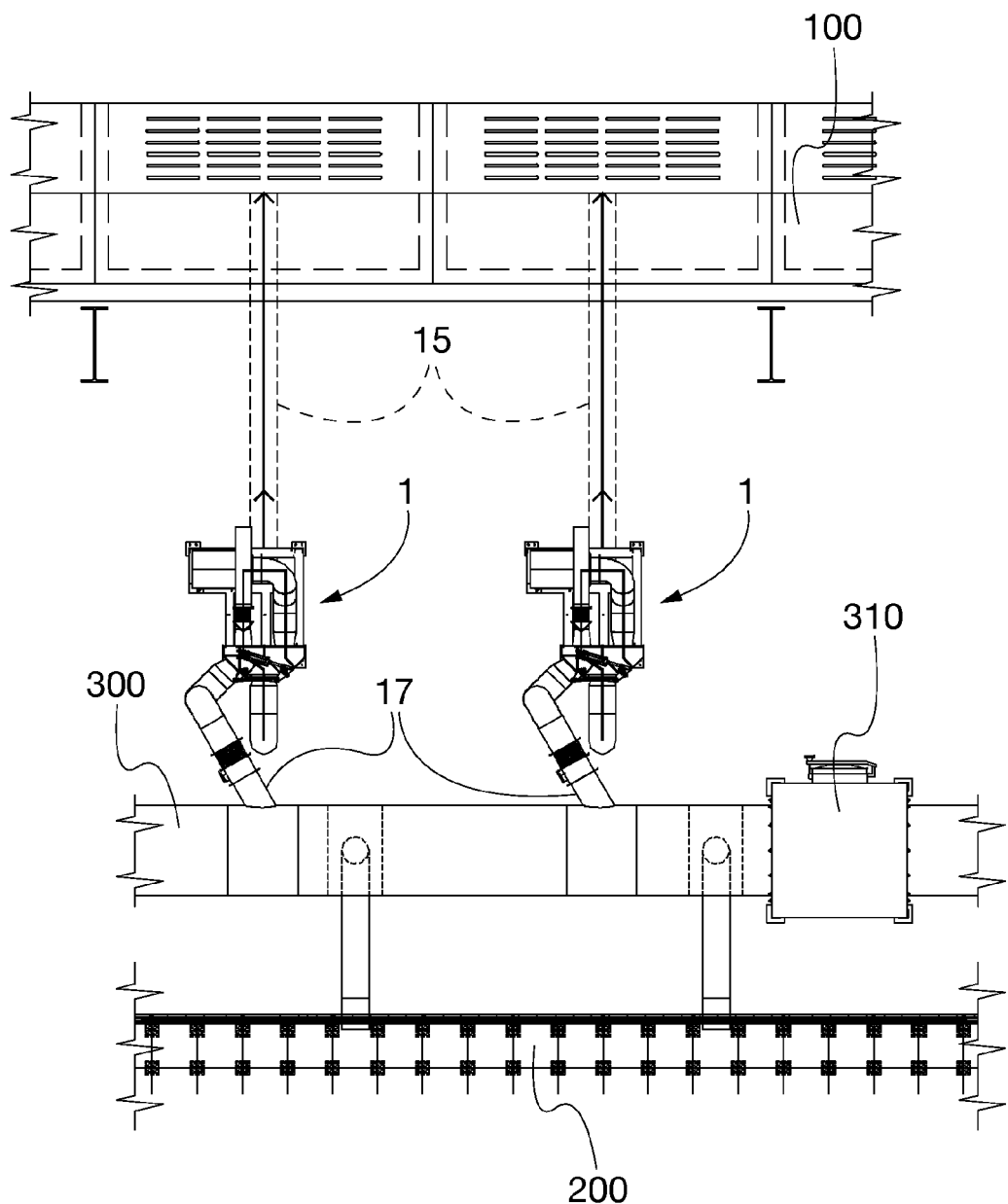
FIG. 3a shows schematically an exemplary application of the ventilation unit of FIG. 1, shown in its first working position of FIG. 2a, to a plant for the aerobic treatment of organic waste.
Figure 3B:
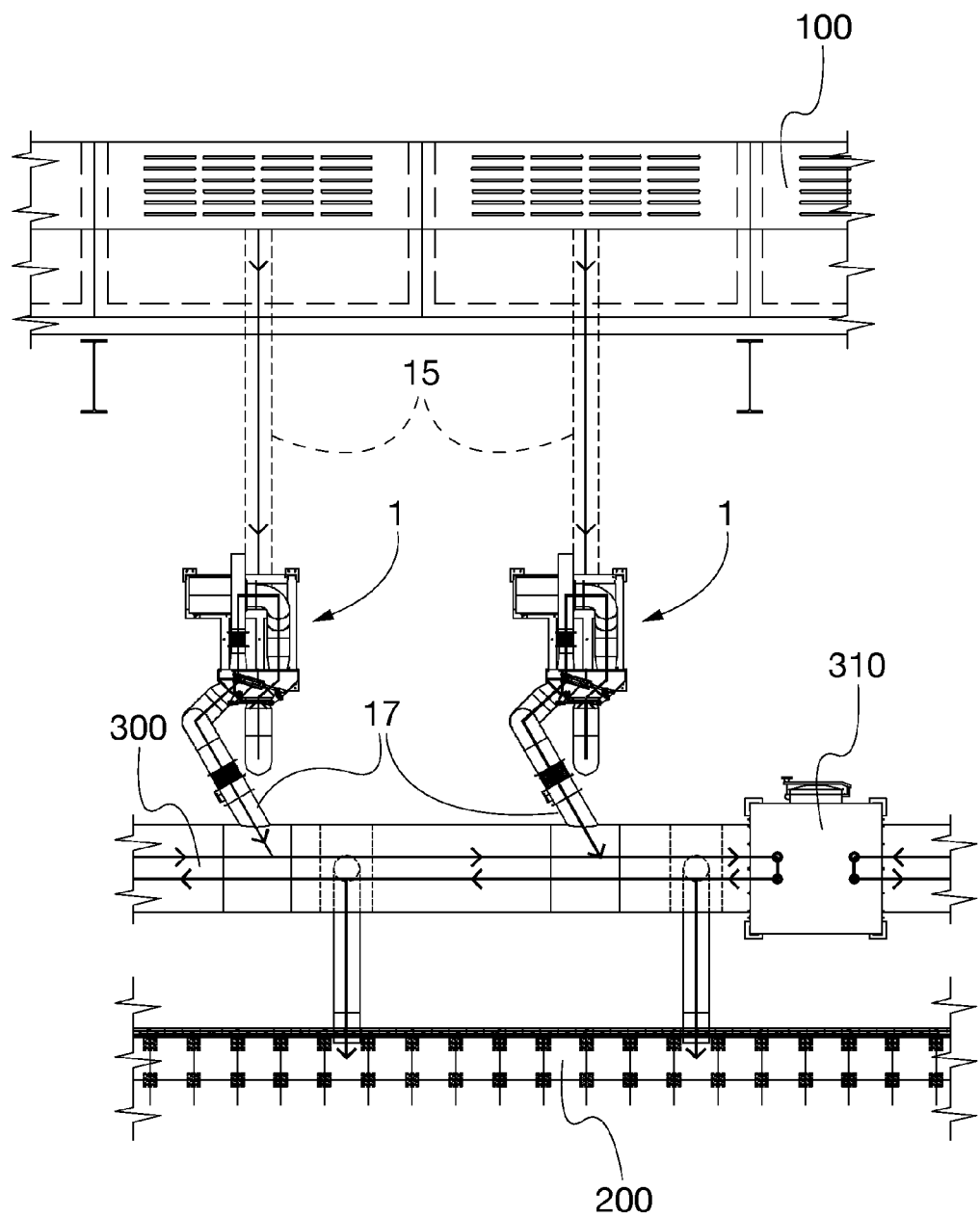
FIG. 3b shows schematically an exemplary application of the ventilation unit of FIG. 1, shown in its second working position of FIG. 2b, to a plant for the aerobic treatment of organic waste.

In FIGS. 3a and 3b there is illustrated by way of example a possible application of the invention to the aerobic treatment of organic waste.

In such application a plurality of ventilation units 1 are connected on one side, through corresponding first piping arrangements 15, to a bio-oxidation area 100 where the organic waste to be subjected to the aerobic treatment, and on the other side, through corresponding second piping arrangements 17, to a bio-filter 200 for filtering the gas flow before it is exhausted to the outer environment.

Thanks to the use of the ventilation units 1 according to the invention, a gas flow—especially an air flow—can be alternately blown into the bio-oxidation area 100 or sucked therefrom through said first piping arrangements 15 depending on the treatment requirements for the organic waste.

As is known, the possibility of blowing/sucking alternately an air flow into/from masses of organic waste allows to aerate said masses and to provide them with an amount of oxygen sufficient for the correct aerobic treatment of the masses themselves.

Referring particularly to FIG. 3a, there is illustrated a situation corresponding to the first working configuration of the ventilation units 1 (see also FIG. 2a). In this situation, a clean air flow is sucked from the outer environment and through the first piping arrangements 15 at the fifth opening (25) it is blown into the bio-oxidation area 100, into the masses of organic waste located there. In this situation any flow through the second piping arrangements 17 is prevented.

With reference to FIG. 3b, there is illustrated a situation corresponding to the second working configuration of the ventilation units 1 (see also FIG. 2b). In shifting to this second situation, a flow reversal has been effected, whereby a contaminated air flow is sucked from the bio-oxidation area 100 through the first piping arrangements 15 and is blown into the second piping arrangements 17 until it reaches a bio-filter 200 where the contaminated air flow is purified before it is discharged into the atmosphere.

Preferably, said second piping arrangements 17 do not lead directly to the bio-filter 200; instead, the second piping arrangements 17 of the ventilation units 1 all open into a single equalization manifold 300 in common, equipped with mixing rooms 310, and the air is sent to the bio-filter only after it has passed through said manifold 300.

The air flow reversal, i.e. the shifting from the phase of blowing into the bio-oxidation area to the phase of sucking from said area, and vice versa, is effected preferably in an automatic manner by detecting the relevant parameters of the microbial activity, such as the $O_2$ content, the temperature of the material or of the air deriving from the material; such parameters, singularly or in combination, allow to regulate the waste treatment process by following control schemes developed on the basis of known kinematics or suitably determined ones.

The ventilation unit according to the present invention can be made of different materials depending on its intended applications. For applications to the treatment of organic waste, it is preferably made of metal materials such as steel, or other materials suitable for withstanding chemical aggression by components that may be present especially in the contaminated air flow coming from the bio-oxidation area.

The invention claimed is:

1. A ventilation unit comprising:

a fan equipped with a first duct or suction duct and a second duct or delivery duct and a first piping arrangement, wherein a switching assembly is provided and arranged between said fan and said first piping arrangement, said switching assembly comprising at least two switching devices movable between two positions in order to allow alternately a passage of a gas flow from said fan to said first piping arrangement and vice versa, wherein said switching assembly includes a casing to which said suction duct and said delivery duct of said fan are connected via respective ports, wherein said casing has three external openings of which a first opening connects said casing to the outer environment, a fifth opening connects said casing to said first piping arrangement and a fourth opening connects said casing to a second piping arrangement, wherein said casing further comprising further comprising two internal openings, the internal openings comprising:

a second opening connecting the first piping arrangement to the suction duct; and a third opening connecting the delivery duct to the first piping arrangement; and wherein one of said two switching devices being movable between said two positions in order to selectively connect said suction duct of said fan to said first opening or said fifth opening via said second opening and wherein the other one of said two switching devices being movable between said two positions in order to selectively connect said delivery duct of said fan to said fourth opening or said fifth opening via said third opening.

2. Ventilation unit according to claim 1, wherein said switching devices are made as wings pivotable around a hinging axis from one of said positions to the other one.

3. Ventilation unit according to claim 1, wherein said switching devices are made as separate and different components.

4. Ventilation unit according to claim 1, wherein said switching devices are integrated in the form of a single piece.

5. Ventilation unit according to claim 1, wherein said switching devices are driven by a single actuator in common.

6. Ventilation unit according to claim 1, wherein said switching devices are driven by separate and different actuators.

7. Plant for the aerobic treatment of organic waste, of the kind comprising a bio-oxidation area in which the waste to be treated is placed, comprising one or more ventilation units according to claim 1, the first piping arrangement of said one or more ventilation units being connected to said bio-oxidation and the second piping arrangement of said one or more ventilation units being connected to a bio-filter.

\* \* \* \* \*